United States Patent
Saldanha et al.

(10) Patent No.: US 11,005,806 B1
(45) Date of Patent: May 11, 2021

(54) METHODS AND APPARATUS FOR DEEP PACKET INSPECTION TO IDENTIFY INTERMEDIATE NETWORK DEVICES

(71) Applicant: Cylera, Inc., New York, NY (US)

(72) Inventors: Anoop Wilbur Saldanha, Mangalore (IN); Apostolos Bakoyiannis, New York, NY (US); James Edwards, New York, NY (US)

(73) Assignee: Cylera, Inc., New York, NY (US)

( * ) Notice: Subject to any disclaimer, the term of this patent is extended or adjusted under 35 U.S.C. 154(b) by 0 days.

(21) Appl. No.: 16/862,908

(22) Filed: Apr. 30, 2020

Related U.S. Application Data

(60) Provisional application No. 62/887,780, filed on Aug. 16, 2019.

(51) Int. Cl.
*H04L 12/28* (2006.01)
*H04L 29/12* (2006.01)
*H04L 12/741* (2013.01)

(52) U.S. Cl.
CPC ............ *H04L 61/103* (2013.01); *H04L 45/74* (2013.01); *H04L 61/2535* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 10,397,116 B1 * | 8/2019 | Volpe ................. | H04L 45/7457 |
| 10,587,491 B1 * | 3/2020 | Volpe ..................... | H04L 43/10 |
| 2005/0066086 A1 | 3/2005 | Ramanathan | |
| 2005/0066088 A1 | 3/2005 | Helfinstine et al. | |
| 2007/0271371 A1 * | 11/2007 | Singh Ahuja ....... | H04L 63/0209 709/224 |
| 2010/0268933 A1 | 10/2010 | Frattura et al. | |
| 2011/0231510 A1 * | 9/2011 | Korsunsky .............. | G06F 21/55 709/213 |
| 2011/0242979 A1 * | 10/2011 | Feroz ...................... | H04L 47/17 370/235 |
| 2011/0276709 A1 * | 11/2011 | Deninger ................ | H04L 63/12 709/230 |
| 2013/0007239 A1 * | 1/2013 | Agarwal .................. | H04L 29/08 709/223 |
| 2013/0247194 A1 | 9/2013 | Jha et al. | |
| 2013/0347103 A1 | 12/2013 | Veteikis et al. | |
| 2017/0366395 A1 * | 12/2017 | Goldfarb ............. | H04L 12/4641 |

(Continued)

OTHER PUBLICATIONS

International Search Report and Written Opinion issued for the PCT Application No. PCT/US19/68367, dated Apr. 16, 2020.

*Primary Examiner* — Phyllis A Book
(74) *Attorney, Agent, or Firm* — Cooley LLP

(57) ABSTRACT

A method of identifying intermediate devices within a communications network includes intercepting a network data packet originating from a second compute device, and parsing the network data packet to identify a client hardware MAC address of the at least one network data packet. The identified client hardware MAC address is compared with a source MAC address stored in a memory operably coupled to the processor, and no match is found. The second compute device is classified as an intermediate device based on the lack of a match between the identified client hardware MAC address and the source MAC address.

5 Claims, 5 Drawing Sheets

(56) References Cited

U.S. PATENT DOCUMENTS

2018/0046811 A1    2/2018  Andriani
2018/0124069 A1    5/2018  Ettema et al.
2018/0309595 A1*  10/2018  Ma ........................ H04L 12/46
2020/0213151 A1*  7/2020  Srivatsan .............. H04L 9/0643

* cited by examiner

METHODS AND APPARATUS FOR DEEP PACKET INSPECTION TO IDENTIFY INTERMEDIATE NETWORK DEVICES

CROSS-REFERENCE TO RELATED APPLICATIONS

This application is a non-provisional of and claims priority under 35 U.S.C. § 119 to U.S. Provisional Patent Application No. 62/887,780, filed Aug. 16, 2019 and titled "Methods and Apparatus For Deep Packet Inspection to Identify Intermediate Network Devices," the entire content of which is incorporated herein by reference in its entirety.

TECHNICAL FIELD

The present disclosure generally relates to forensic identification of electronic devices, and more specifically, to identifying intermediate devices within a computing network.

BACKGROUND

With the modern proliferation of network-connected electronic devices, there is an ever-increasing need to identify techniques for effectively monitoring such devices.

SUMMARY

In some embodiments, a method for identifying intermediate devices within a communications network includes intercepting, at a first network device, a network data packet originating from a second compute device, and parsing the network data packet to identify a client hardware MAC address of the at least one network data packet. The identified client hardware MAC address is compared with a source MAC address stored in a memory operably coupled to the processor, and no match is found. The second compute device is classified as an intermediate device based on the lack of a match between the identified client hardware MAC address and the source MAC address.

In some embodiments, a method for identifying intermediate devices within a communications network includes receiving (e.g., from a remote compute device) metadata associated with network data packets of network traffic within a communication network of interest. Based on the metadata, a client hardware MAC address of the network data packets is identified, and compared with a source MAC address (e.g., stored in a memory). Upon detection that the identified client hardware MAC address does not match the source MAC address, a second compute device, from which the network data packets were most recently sent, is classified as an intermediate device.

In some embodiments, a method for identifying intermediate devices within a communications network includes intercepting, at a first network device, a first network data packet originating from a second compute device, during transmission of the first network data packet within a communication network. The first network data packet is parsed, to identify a plurality of fields of the first network data packet. The plurality of fields includes a source MAC address for a second compute device. A record including a representation of the source MAC address and a source IP address of the first network data packet is stored in a table within memory operatively coupled to the processor. Multiple additional network data packets are received and parsed to identify multiple sets of fields. Each set of fields is associated with a network data packet from the multiple additional network data packets. The table is updated in response to detecting that a plurality of fields from the multiple pluralities of fields includes a representation of the source MAC address. Updating the table includes adding an additional record that includes the representation of the source MAC address and a source IP address from the plurality of fields that includes the representation of the source MAC address. Upon detecting that a number of records in the table exceeds a threshold number of records (and in response to such detection), the second compute device is classified as an intermediate device.

In some embodiments, a method for identifying intermediate devices within a communications network includes intercepting multiple network data packets and parsing each network data packet from the multiple network data packets to identify fields of each network data packet from the multiple network data packets. A subset of network data packets is detected, from the multiple network data packets, for which: (1) each network data packet of the subset of network data packets includes a common MAC address, (2) the network data packets of the subset of network data packets are sent within a specified period of time of one another, and (3) each network data packet of the subset of network data packets includes a different IP address. A second compute device, associated with the common MAC address, is classified as an intermediate device based on detecting the subset of network data packets.

In some embodiments, a system for identifying intermediate devices within a communications network includes a processor and a memory in operable communication with the processor. The memory stores processor-executable instructions to intercept a first network data packet originating from a compute device, during transmission of the first network data packet within a communication network. The processor-executable instructions also include instructions to parse the first network data packet to identify multiple fields of the first network data packet, the multiple fields including a source MAC address for the compute device. The processor-executable instructions also include instructions to store, in a table of the memory, a record including a representation of the source MAC address and a source IP address of the first network data packet, and to receive multiple additional network data packets. The processor-executable instructions also include instructions to parse the multiple additional network data packets to identify multiple sets of fields. Each set of fields is associated with a network data packet from the multiple additional network data packets. The processor-executable instructions also include instructions to update the table, in response to detecting that multiple fields from the multiple pluralities of fields include a representation of the source MAC address, to include an additional record. The additional record includes the representation of the source MAC address and a source IP address from the multiple fields that includes the representation of the source MAC address. The processor-executable instructions also include instructions to detect that a number of records in the table exceeds a threshold number of records, and to classify the compute device as an intermediate device based on detecting that the threshold number of records has been exceeded.

DETAILED DESCRIPTION

Figure 1:
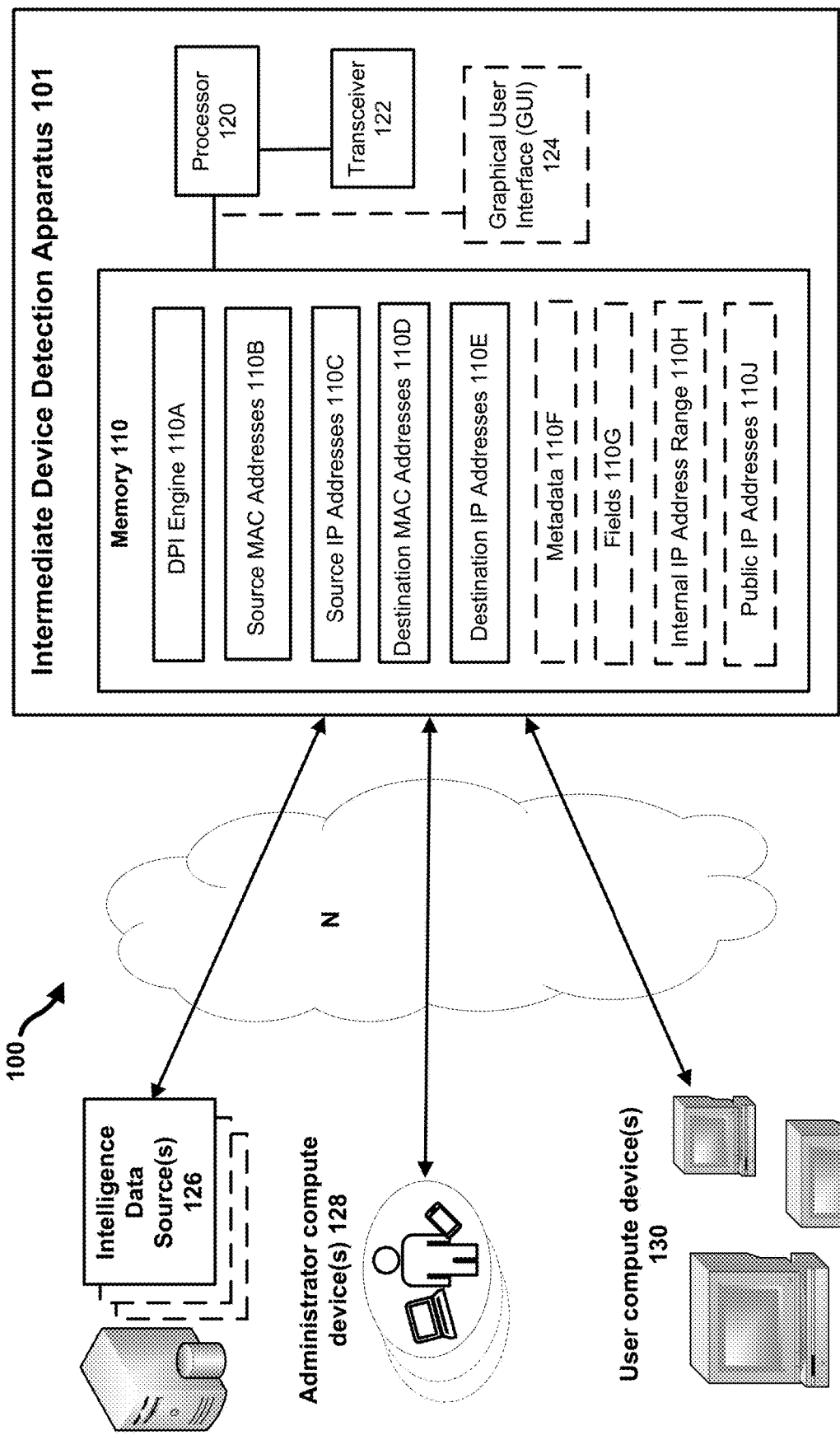
FIG. 1 is a system block diagram of a system for identifying intermediate devices within a communications network, according to some embodiments.

As the number of network-connected compute devices continues to increase, at a rate that is accelerated by the advent of Internet of Things (IoT) and inexpensive hardware, the identification and cybersecurity monitoring of such compute devices by information technology (IT) and Security Operations Center (SoC) staff are of increasing importance. "Bring your own device" workplace policies have led to an increased burden on such monitoring efforts. Moreover, in some instances, the availability of multiple wireless networks at the workplace and/or the unmonitored and indiscriminate access of restricted wireless networks by non-approved and non-secure devices have hampered security, network visibility, and cybersecurity policy compliance.

The fingerprinting of networked endpoint devices (such as medical devices, laptop computers, mobile devices, etc., also referred to herein as "end user devices") can be an important component of an organization's cybersecurity program, and a first step in fingerprinting can be the detection of the endpoint devices themselves. The detection of endpoint devices using known techniques can be hindered, however, by the presence of "intermediate devices" including, but not limited to: routers, switches, firewalls, relays, etc. Such intermediate devices can in some instance, undesirably modify packets being transmitted to and/or from endpoint devices, such that a source device associated with the packets cannot be identified.

One or more embodiments set forth herein address the foregoing challenges by uniquely identifying intermediate devices, so that they can be differentiated from endpoint devices, and so that a more comprehensive overview of a networked system of compute devices can be generated and monitored. In some embodiments, intermediate devices are identified using a deep packet inspection (DPI) engine that detects network-related properties based on data packets and data flows within the network. The DPI engine can be implemented in software and/or hardware, and can function as an intrusion detection system (IDS) or intrusion prevention system (IPS). The data packets and data flows can be detected, for example, via passive packet sniffing performed by the DPI engine or another compute device such as a packet analyzer, packet capture appliance, wireless analyzer and/or WiFi analyzer. In some implementations, the data packets and/or data flows are analyzed to determine (e.g., based on a media access control (MAC) address of the data packet) whether they have been modified by one or more of intermediate devices (which may already have previously been identified by the DPI engine, and/or whose data can be accessed by the DPI engine), as well as which of the one or more of the intermediate devices performed the modifying. The capability provided by systems and methods set forth herein to identify intermediate devices facilitates (1) the detection of the existence of one or more networked endpoint devices, (2) the identification of the one or more networked endpoint devices (located behind the intermediate devices), (3) the fingerprinting of the one or more networked endpoint devices, and (4) the generation of a representation of a topology of the network, for presentation (e.g., in real time and/or via a graphical user interface (GUI)) to a user, thereby providing improved visibility into an associated network topology, optionally implemented in a passive manner, for enhanced cybersecurity as compared with known methods. As used herein, an "intermediate device" can refer to any compute device within a communications path between a source compute device (i.e., a compute device that originates a message) and an endpoint or other destination compute device (i.e., a compute device to which the originated message is ultimately intended). In some implementations, a source compute device is a client device, and a destination device is a server.

In some embodiments, a method for uniquely identifying intermediate devices includes searching for network-related properties associated with particular data packets and data flows. Examples of network-related properties include, but are not limited to: MAC addresses, IP addresses, MAC address mismatches, MAC thresholds (e.g., a number of MAC mobility events detected for a given MAC address within a detection window before that MAC address is identified as a duplicate MAC address, and after which updates for the MAC address are suppressed), IP thresholds, MAC-IP thresholds, public_ip and MAC combinations, etc. Such methods can be useful in preventing the incorrect assignment of intermediate MAC addresses as endpoint MAC addresses during data communications, and in identification of endpoint devices that are "behind" (e.g., downstream or upstream of) the intermediate device or otherwise associated with a different hop (or stage) of a multi-hop communication flow than a hop associated with the particular data packet being analyzed.

System Overview

To connect a compute device to a network, a discovery message is typically sent from the compute device to a server, such as a dynamic host control protocol (DHCP) server, and in response to the discovery message, an offer message is sent from the server to the compute device. The compute device can then send a request message (including one or more data packets) to the server to obtain an internet protocol (IP) address. The request message can be in the form of a broadcast packet, and can include a physical (MAC) address associated with the compute device, such as the MAC address of the WiFi® adapter. In response to receiving the request message, the server can send a response message (e.g., a DHCP message) that includes a designation/assignment of an IP address for the compute device.

Once connected to the network, the compute device (disposed, for example, behind a router) may attempt to communicate with a web server. Each data packet sent by the compute device can include a source MAC address and a destination MAC address. In a first hop, a data packet sent from the compute device specifies the router MAC address, and thus arrives at the router. Once the data packet has reached the router, the router may (or may not) modify the source MAC address of the data packet (e.g., to its own MAC address), thereby generating a modified data packet, before forwarding the modified data packet for the next hop. Such data packet modifications, when detected by the DPI engine, can be used as part of the identification of intermediate devices within a network, as well as the source and destination compute devices associated with a data packet.

As an example implementation of one embodiment, consider that three mobile devices are sending network data packets. Mobile device #1 sends a network data referencing a source MAC address of "1" (represented by the value "source_MAC_1") and a source IP address of "2" (represented by the value "source_IP_1") to a router for forwarding to the internet. Similarly, mobile device #2 sends a network data referencing source_MAC_2 and source_IP_2 to the router for forwarding to the internet, and mobile device #3 sends a network data referencing source_MAC_3 and source_IP_3 to the router for forwarding to the internet. The router, having a source MAC address of "Z," and in response to receiving the network data packets from mobile devices 1-3, modifies the received network data packets by replacing the source MAC addresses with its own, and then sends, to the network: (1) a network data packet referencing source_MAC_Z and source_IP_1, (2) a network data packet referencing source_MAC_Z and source_IP_2, and (3) a network data packet referencing source_MAC_Z and source_IP_3. The DPI engine can intercept, analyze or "sniff" all three network data packets sent from the router to the network (e.g., the Internet, a local area network (LAN) network associated with an organization, a virtual private network (VPN), etc.). Based on the fact that these three network data packets all have the same MAC address, but have different IP addresses, and are sent near-in-time to one another, the DPI engine can determine that source_MAC_Z is a router (and, thus, is an intermediate device).

In some embodiments, a network inspection module or DPI engine receives/obtains (e.g., via passive "packet sniffing") a feed of some or all data packets being transmitted within a network of compute devices as part of the associated network traffic ("network data packets"). Once the DPI has received network data packets, the DPI can parse the network data packets to extract fields from and/or generate metadata for the network data packets. Fields extracted from the network data packets can include MAC addresses and/or internet protocol (IP) addresses of the network data packets. For example, by parsing a given network data packet, a source MAC address, a source IP address, a destination MAC address and a destination IP address of the packet can be identified. These fields can be referred to and stored as: pkt_src_mac_address, pkt_src_ip_address, pkt_dest_mac_address, and pkt_dest_ip_address, respectively. When one or more network data packets contains dynamic host control protocol (DHCP) data units (also referred to herein as "protocol data units," PDUs), the DHCP PDUs can be parsed to extract one or more fields, which can include a client MAC hardware address, as identified by the field "chaddr" in the Request for Comments (RFC) (e.g., RFC 2131) of the DHCP PDU. Extracted fields and generated metadata can be stored by the DPI engine in a local and/or remotely-accessible memory.

Alternatively or in addition, the DPI engine can receive network metadata for the data packets on the network from a source compute device (e.g., a local compute device, or a remote compute device in wireless network communication therewith), without parsing data packets. The metadata can be generated, for example, by one or more of (but not limited to): another DPI engine, such as an IPS, IDS, firewall or network inspection device, or a compute device of a security information and event management (SIEM) system. Metadata received from a source compute device can be stored by the DPI engine in a local and/or remotely-accessible memory. Metadata generated by the parsing of intercepted, analyzed or sniffed data packets, and/or metadata received from a source compute device, can be further processed by the DPI engine (and/or by another local or cloud-accessible compute device), as shown and discussed further with reference to FIGS. 2-5 below.

In some embodiments, if the generated and/or received metadata is DHCP request metadata, the DPI engine references the "chaddr" field of the DHCP metadata, which indicates the MAC address of the device/hardware that is attempting (via the intercepted/sniffed message) to obtain an IP address using DHCP protocol. Also based on the DHCP metadata, the DPI engine identifies the "source MAC address" as the MAC address of the client device from which the DHCP request PDUs would be sent, and identifies the "destination MAC address" as the MAC address of the server to which the DHCP request is being sent. A DHCP request can be, for example, a DHCP DISCOVER message/PDU (e.g., requesting a response from a DHCP server) or a DHCP REQUEST message/PDU (e.g., including a request to lease an IP address from an offering DHCP server).

In some embodiments, if the generated and/or received metadata is DHCP response metadata (e.g., associated with a DHCP response PDU), the DPI engine can identify the source MAC address and the destination MAC address based on the type of message being sent. A DHCP response can be, for example, a DHCP OFFER message/PDU (e.g., offering an IP address to the requesting client compute device) or a DHCP ACK message/PDU (e.g., acknowledging a received message from a client compute device, assigning one or more configured DHCP options and/or including an update to a DHCP database). For a DHCP OFFER message/PDU and a DHCP ACK message/PDU, the DPI engine can identify the DHCP server MAC address as the destination MAC address and the client MAC address as the source MAC address. For a DHCP DISCOVER message/PDU and a DHCP REQUEST message/PDU, the DPI engine can identify the client MAC address as the source MAC address and the DHCP server MAC address as the destination MAC address. In some embodiments, the DPI engine can detect the inclusion of references to user datagram protocol (UDP) ports within the data packet(s) and/or metadata, and in response to detecting the UDP port reference(s), the DPI engine can identify the network data packet (or a network data packet associated with that metadata) as a DHCP packet. Alternatively or in addition, the DPI engine can detect that a network data packet associated with the metadata is a DHCP packet based on a sequence of network data packets (and/or associated metadata) to which that network data packet belongs. For example, a DHCP sequence can include: a DHCP DISCOVER message/PDU, a DHCP OFFER message/PDU, a DHCP REQUEST message/PDU, and a DHCP ACK message/PDU. Alternatively or in addition, UDP port numbers within the metadata can be used by the DPI engine to detect a communication "direction" of the network data packet, and thus to assign source and destination MAC addresses. For example, if the target user datagram protocol (UDP) port referenced by the metadata is a first value (e.g., 67), the DPI engine can identify a MAC address associated with the port having the first value (67) as the destination MAC address, and identifies a MAC address associated with the port number on the other endpoint of the packet, (e.g., port 68) as the source MAC address. Similarly, if the target UDP port is 68, the DPI engine identifies the MAC address associated with port 68 as the source MAC address, and identifies the MAC address associated with the port number on the other endpoint of the packet, (e.g., port 67) as the destination MAC address. The source MAC address and the destination MAC address can be referred to and stored as src_mac_address and dest- _mac_address, respectively. In some embodiments, when a "chaddr" field is extracted by the DPI engine from an RFC of a DHCP PDU, the chaddr value is compared with a stored value of src_mac_address. If the values are not equal, the src_mac_address is identified as an intermediate device MAC address. Since DHCP servers can sometimes be embedded within a router or other intermediate device, when the DPI engine determines that metadata is DHCP metadata (e.g., based on a MAC organizationally unique identifier (OUI) detected within the network data packet or metadata), the associated dest_mac_address can optionally be designated (or "tagged") by the DPI engine as being an intermediate device (e.g., a router, switch, relay, firewall, etc.) in addition to being tagged as a DHCP server. The tagging (or not tagging) of the dest_mac_address as being an intermediate device can be based, for example, on the MAC OUI. As used herein, "tagging" can include storage, e.g., in a table within memory operably coupled to the DPI engine, of MAC and/or IP addresses together observed within network data packets of the network traffic, together with associated data such as equipment category, equipment type, etc.

In some embodiments, the DPI engine can employ thresholds to identify intermediate devices. For example, the DPI engine can parse a received network data packet to identify pkt_src_mac_address, pkt_src_ip_address, pkt_dest_mac_address, pkt_dest_ip_address fields, as discussed above, and a threshold table is constructed, for example using the mac_addresses as a key. For each unique pkt_src_mac_address, a set or list can be generated that includes a representation of every new pkt_src_ip_address observed/identified as being associated with that MAC address. Similarly, for each unique pkt_dest_mac_address, a set or list can be generated that includes a representation of every new pkt_dest_ip_address observed/identified as being associated with that MAC address. For any of the foregoing MAC addresses, if a total number of different IP addresses in the set associated with that MAC address exceeds a specified threshold (e.g., 5), the DPI engine can identify that MAC address as a MAC address of an intermediate device. The threshold can be definable/adjustable by a user (e.g., by a network administrator or other IT profession) as desired.

In some embodiments, public IP addresses used by public-facing routers and/or firewalls of the network under inspection are identified by the DPI engine (e.g., received from a remote repository and/or sniffed) and stored. Network data packets subsequently observed by the DPI engine to include a destination IP address that matches one of the previously-identified public IP addresses, the DPI engine can associate the MAC address associated with the corresponding IP address(es) as a router or firewall MAC address.

In still other embodiments, a range of IP addresses used by hosts internal to the network are identified by or provided to the DPI engine (e.g., received from or input by a network administrator and/or determined by the DPI engine via analysis of network data packets) and stored. The IP addresses can include, for example, IP addresses that conform with the RFC 1918 standard. Network data packets subsequently observed by the DPI engine to include a destination IP address that (1) is a public IP address, and (2) belongs to the previously-identified range of IP addresses used by hosts internal to the network, the DPI engine can associate the MAC address associated with the corresponding IP address(es) as a router or firewall MAC address (and, thus, associated with an intermediate device).

Turning to the drawings, FIG. 1 is a system block diagram of a system for identifying intermediate devices within a communications network, according to some embodiments.

As shown in FIG. 1, the system 100 includes an intermediate device detection apparatus 101 including a memory 110 operably coupled to a processor 120. The processor 120 is communicatively coupled to a transceiver 122 for the sending and receiving of signals, and the processor 120 is also optionally communicatively coupled to a graphical user interface (GUI) 124 for presentation of graphical or other representations of data generated by the intermediate device detection apparatus 101. The memory 110 includes a DPI engine 110A (including processor-executable instructions written in code) as well as a variety of stored data, including some or all of the following (depending on the application): source MAC addresses 110B, source IP addresses 110C, destination MAC addresses 110C, destination IP addresses 110E, metadata 110F, fields 110G, internal IP address range(s) (or values thereof) 110H, and public IP addresses (or ranges thereof) 110J. The intermediate device detection apparatus 101 is in wireless network communication, via a network "N," with administrator compute device(s) 128 (e.g., compute device(s) of network administrators or other IT professionals), user compute devices 130, and intelligence data sources 126.

Figure 2:
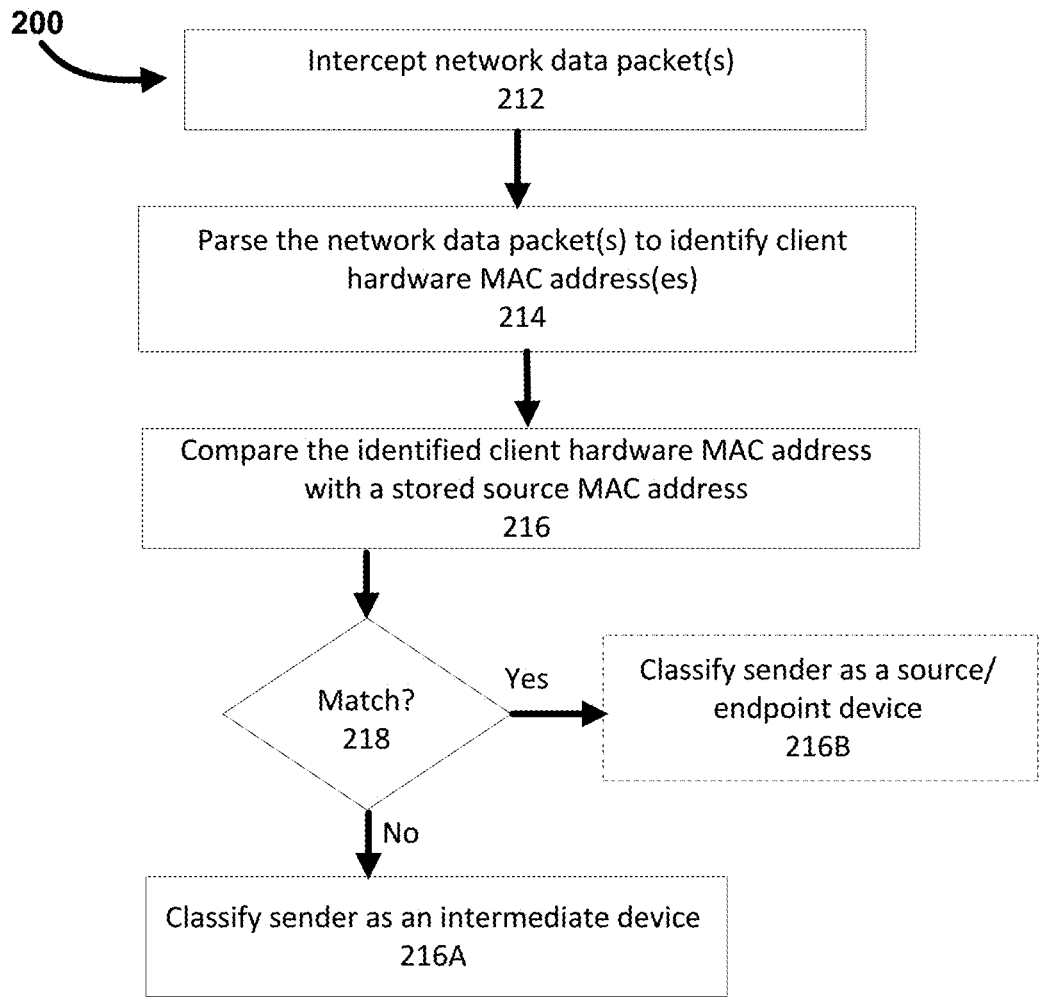
FIG. 2 is a flowchart illustrating an example method for identifying intermediate devices within a communications network, according to some embodiments.

FIG. 2 is a flowchart illustrating an example method for identifying intermediate devices within a communications network, according to some embodiments. The method of FIG. 2 can be performed, for example, by the intermediate device detection apparatus 101 of FIG. 1. As shown in FIG. 2, the method 200 includes intercepting one or more network data packets originating from a compute device, at 212, and parsing the network data packet at 214 to identify a client hardware MAC address of the at least one network data packet. The identified client hardware MAC address is compared, at 216, with a source MAC address stored in a memory operably coupled to the processor. If no match is found at 218, the sender compute device is classified (at 216A) as an intermediate device based on the lack of a match between the identified client hardware MAC address and the source MAC address. If a match is found at 218, the sender compute device is optionally classified (at 216B) as a source/endpoint device based on the match between the identified client hardware MAC address and the stored source MAC address.

Figure 3:
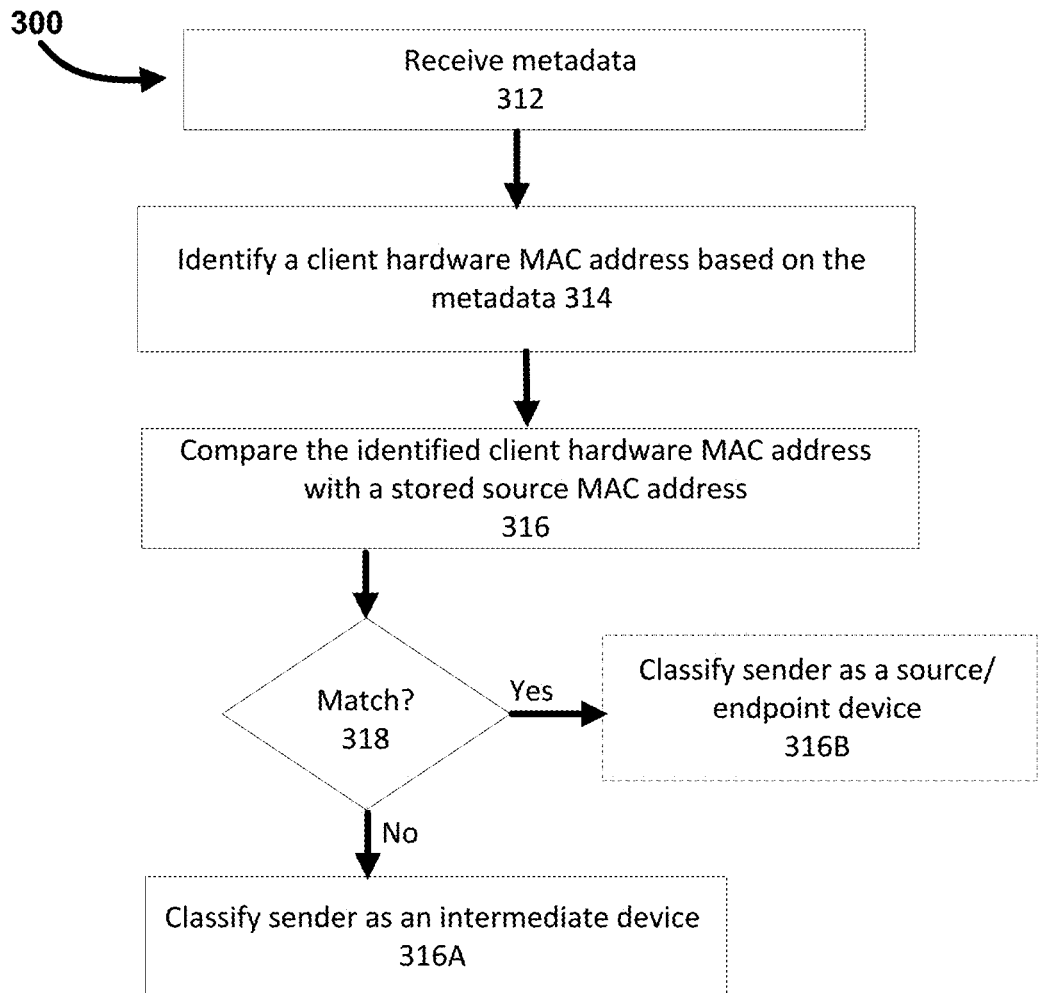
FIG. 3 is a flowchart illustrating an example method for identifying intermediate devices within a communications network, according to some embodiments.

FIG. 3 is a flowchart illustrating an example method for identifying intermediate devices within a communications network, according to some embodiments. The method of FIG. 3 can be performed, for example, by the intermediate device detection apparatus 101 of FIG. 1. As shown in FIG. 3, the method 300 includes receiving, at 312, (e.g., from a remote compute device) metadata associated with network data packets of network traffic within a communication network of interest. Based on the metadata, a client hardware MAC address of the network data packets is identified, at 314, and compared (at 316) with a source MAC address (e.g., stored in a memory). Upon detection, at 318, that the identified client hardware MAC address does not match the source MAC address, a compute device from which the network data packets were most recently sent is classified, at 316A, as an intermediate device. If a match is found at 318, the sender compute device is optionally classified (at 316B) as a source/endpoint device based on the match between the identified client hardware MAC address and the stored source MAC address.

Figure 4:
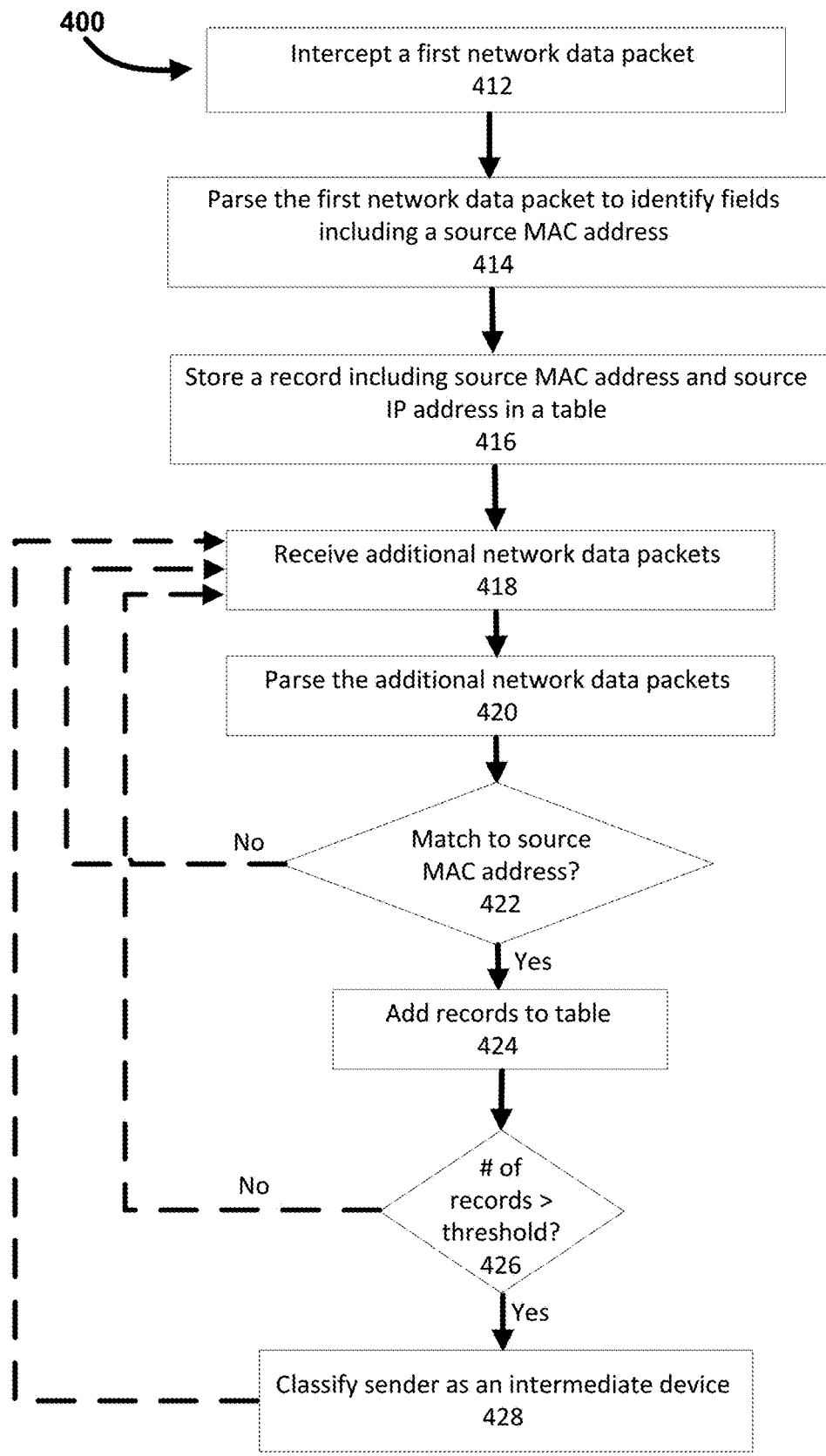
FIG. 4 a flowchart illustrating an example method for identifying intermediate devices within a communications network, according to some embodiments.

FIG. 4 a flowchart illustrating an example method for identifying intermediate devices within a communications network, according to some embodiments. The method of FIG. 4 can be performed, for example, by the intermediate device detection apparatus 101 of FIG. 1. As shown in FIG.

4, the method 400 includes intercepting, at 412, a first network data packet originating from a compute device, during transmission of the first network data packet within a communication network. The first network data packet is parsed, at 414, to identify a plurality of fields of the first network data packet, the plurality of fields including a source MAC address for the compute device. A record including a representation of the source MAC address and a source IP address of the first network data packet is stored (at 416) in a table within memory operatively coupled to the processor. Multiple additional network data packets are received at 418 and parsed at 420 to identify multiple sets of fields, each set of fields associated with a network data packet from the multiple additional network data packets. The table is updated in response to detecting, at 422, that a plurality of fields from the multiple pluralities of fields includes a representation of the source MAC address (i.e., a "match" is detected). If no match is detected at 422, the method 400 optionally loops back to receiving additional network packets at 418. Updating the table includes adding an additional record, at 424, the additional record including the representation of the source MAC address and a source IP address from the plurality of fields that includes the representation of the source MAC address. Upon detecting, at 426, that a number of records in the table exceeds a threshold number of records (and in response to such detection), the compute device is classified (at 428) as an intermediate device, and the method 400 optionally loops back to receiving additional network packets at 418. If it is determined at 426 that the number of records in the table does not exceed the threshold number of records, the method 400 optionally loops back to receiving additional network packets at 418.

Figure 5:
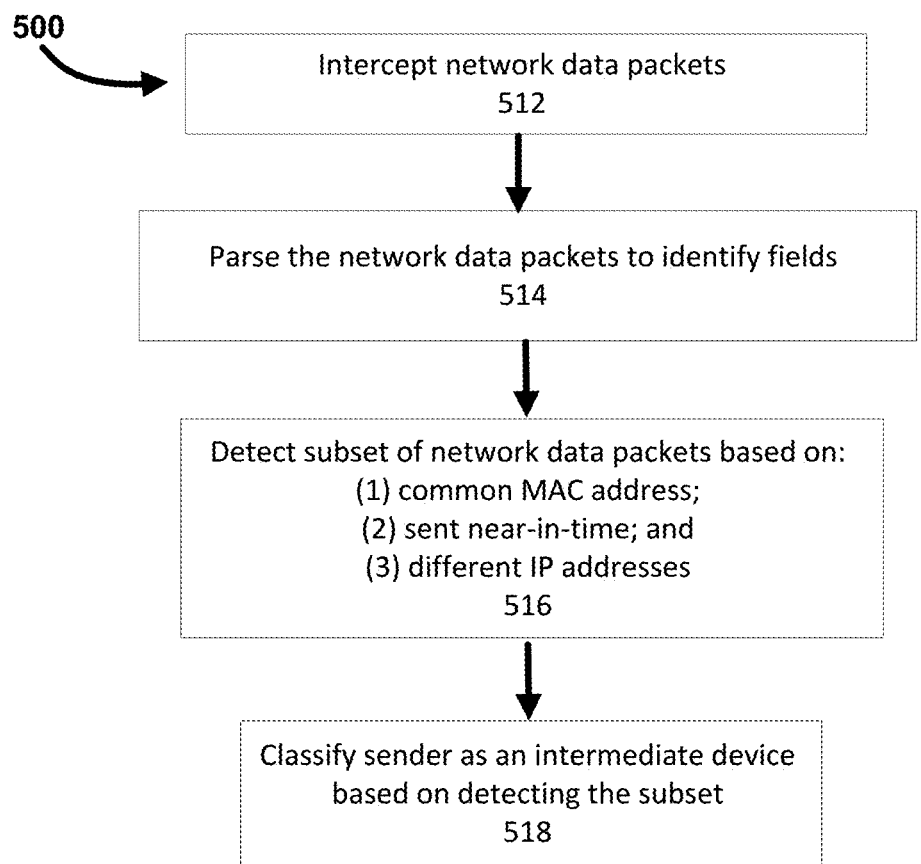
FIG. 5 a flowchart illustrating an example method for identifying intermediate devices within a communications network, according to some embodiments.

FIG. 5 a flowchart illustrating an example method for identifying intermediate devices within a communications network, according to some embodiments. The method of FIG. 5 can be performed, for example, by the intermediate device detection apparatus 101 of FIG. 1. As shown in FIG. 5, the method 500 includes intercepting multiple network data packets at 512 and parsing each network data packet from the multiple network data packets, at 514, to identify fields of each network data packet from the multiple network data packets. At 516, a subset of network data packets is detected, from the multiple network data packets, for which: (1) each network data packet of the subset of network data packets includes a common MAC address, (2) the network data packets of the subset of network data packets are sent within a specified period of time of one another, and (3) each network data packet of the subset of network data packets includes a different IP address. A second compute device, associated with the common MAC address, is classified (at 518) as an intermediate device based on detecting the subset of network data packets.

In some embodiments, a system for identifying intermediate devices within a communications network includes a processor and a memory in operable communication with the processor. The memory stores processor-executable instructions to intercept a first network data packet originating from a compute device, during transmission of the first network data packet within a communication network. The processor-executable instructions also include instructions to parse the first network data packet to identify multiple fields of the first network data packet, the multiple fields including a source MAC address for the compute device. The processor-executable instructions also include instructions to store, in a table of the memory, a record including a representation of the source MAC address and a source IP address of the first network data packet, and to receive multiple additional network data packets. The processor-executable instructions also include instructions to parse the multiple additional network data packets to identify multiple sets of fields, each set of fields associated with a network data packet from the multiple additional network data packets. The processor-executable instructions also include instructions to update the table, in response to detecting that multiple fields from the multiple pluralities of fields includes a representation of the source MAC address, to include an additional record, the additional record including the representation of the source MAC address and a source IP address from the multiple fields that includes the representation of the source MAC address. The processor-executable instructions also include instructions to detect that a number of records in the table exceeds a threshold number of records, and to classify the compute device as an intermediate device based on detecting that the threshold number of records has been exceeded.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program attributes (an attribute collection), other attributes and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
   intercepting, via a processor of a first compute device and during transmission within a communication network, at least one network data packet originating from a second compute device;
   parsing the network data packet, via the processor, to identify a client hardware MAC address of the at least one network data packet;
   comparing the identified client hardware MAC address with a source MAC address stored in a memory operably coupled to the processor;
   detecting that the identified client hardware MAC address does not match the source MAC address; and
   classifying the second compute device as an intermediate device based on detecting that the identified client hardware MAC address does not match the source MAC address.

2. A method, comprising:
   receiving, at a processor of a first compute device, metadata associated with network data packets of network traffic within a communication network of interest;
   identifying, based on the metadata, a client hardware MAC address of the network data packets;
   comparing the identified client hardware MAC address with a source MAC address stored in a memory operably coupled to the processor;
   detecting that the identified client hardware MAC address does not match the source MAC address; and
   classifying a second compute device, from which the network data packets were most recently sent, as an intermediate device based on detecting that the identified client hardware MAC address does not match the source MAC address.

3. A method, comprising:
   intercepting, via a processor of a first compute device and during transmission within a communication network, a first network data packet originating from a second compute device;
   parsing the first network data packet, via the processor, to identify a plurality of fields of the first network data packet, the plurality of fields including a source MAC address for a second compute device;
   storing, in a table within memory operatively coupled to the processor, a record including a representation of the source MAC address and a source IP address of the first network data packet;
   receiving, at the processor, a plurality of additional network data packets;
   parsing, via the processor, the plurality of additional network data packets to identify multiple pluralities of fields, each plurality of fields associated with a network data packet from the plurality of additional network data packets;
   updating the table, in response to detecting that a plurality of fields from the multiple pluralities of fields includes a representation of the source MAC address, to include an additional record, the additional record including the representation of the source MAC address and a source IP address from the plurality of fields that includes the representation of the source MAC address;
   detecting that a number of records in the table exceeds a threshold number of records; and
   classifying the second compute device as an intermediate device based on detecting that the threshold number of records has been exceeded.

4. A method, comprising:
   intercepting, via a processor of a first compute device and during transmission within a communication network, a plurality of network data packets;
   parsing each network data packet from the plurality of network data packets, via the processor, to identify fields of each network data packet from the plurality of network data packets;
   detecting a subset of network data packets, from the plurality of network data packets, for which: (1) each network data packet of the subset of network data packets includes a common MAC address, (2) the network data packets of the subset of network data packets are sent within a specified period of time of one another, and (3) each network data packet of the subset of network data packets includes a different IP address; and
   classifying a second compute device, associated with the common MAC address, as an intermediate device based on detecting the subset of network data packets.

5. A system, comprising:
   a processor; and
   a memory in operable communication with the processor and storing processor-executable instructions to:
     intercept, during transmission within a communication network, a first network data packet originating from a compute device;
     parse the first network data packet to identify a plurality of fields of the first network data packet, the plurality of fields including a source MAC address for the compute device;
     store, in a table of the memory, a record including a representation of the source MAC address and a source IP address of the first network data packet;
     receive a plurality of additional network data packets;
     parse the plurality of additional network data packets to identify multiple pluralities of fields, each plurality of fields associated with a network data packet from the plurality of additional network data packets;
     update the table, in response to detecting that a plurality of fields from the multiple pluralities of fields includes a representation of the source MAC address, to include an additional record, the additional record including the representation of the source MAC address and a source IP address from the plurality of fields that includes the representation of the source MAC address;
     detect that a number of records in the table exceeds a threshold number of records; and
     classify the compute device as an intermediate device based on detecting that the threshold number of records has been exceeded.

* * * * *